US012212400B2

(12) United States Patent
Torres

(10) Patent No.: US 12,212,400 B2
(45) Date of Patent: Jan. 28, 2025

(54) METHOD AND SYSTEM FOR HYBRID SOFTWARE DEFINED NETWORKING IN A TERRESTRIAL PLUS MOBILE NETWORK NODE NETWORK

(71) Applicant: Hughes Network Systems, Germantown, MD (US)

(72) Inventor: Rob Torres, New Market, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 345 days.

(21) Appl. No.: 17/823,231

(22) Filed: Aug. 30, 2022

(65) Prior Publication Data

US 2023/0261736 A1    Aug. 17, 2023

Related U.S. Application Data

(60) Provisional application No. 63/310,527, filed on Feb. 15, 2022.

(51) Int. Cl.
*H04B 7/185* (2006.01)
*H04W 40/02* (2009.01)
*H04W 80/04* (2009.01)

(52) U.S. Cl.
CPC ........ *H04B 7/18513* (2013.01); *H04W 40/02* (2013.01); *H04W 80/045* (2013.01)

(58) Field of Classification Search
CPC . H04B 7/18513; H04W 40/02; H04W 80/045
See application file for complete search history.

(56) References Cited

U.S. PATENT DOCUMENTS 8,811,172 B1 * 8/2014 Sella .................. H04L 45/00
                                                      370/227
9,444,677 B2 * 9/2016 Kumar ................ H04L 45/28
(Continued)

FOREIGN PATENT DOCUMENTS

EP       3384641 A1   10/2018
WO    2017092780 A1    6/2017

OTHER PUBLICATIONS

International search report for PCT Application No. PCT/US2023/062172.

*Primary Examiner* — Bailor C Hsu
(74) *Attorney, Agent, or Firm* — Capitol City TechLaw; Jasbir Singh

(57) ABSTRACT

A method and system for simplifying interactions of a Software Defined Network (SDN) controller including: receiving a network program to traverse a mobile node network including mobile nodes and ground nodes, wherein the ground nodes include an ingress node and an egress node; forecasting links, based on a temporal line-of-sight topology, of the mobile node network between the mobile nodes and the ground nodes; determining network program subfunctions that reflect an availability of the links for a time period; selecting, for the time period, a viable path including one or more of the network program subfunctions to traverse from the ingress node to the egress node; and communicating network traffic from the ingress node to the egress node using the viable path during the time period, wherein a portion of the viable path traverses one or more of the mobile nodes and the mobile nodes move along deterministic paths.

20 Claims, 5 Drawing Sheets

(56) References Cited

U.S. PATENT DOCUMENTS

| | | | |
|---|---|---|---|
| 10,728,826 B2* | 7/2020 | Pennington | H04W 40/12 |
| 10,819,653 B2* | 10/2020 | Dilger | H04L 45/123 |
| 10,999,219 B1* | 5/2021 | Athreyapurapu | H04L 41/0806 |
| 2015/0163152 A1 | 6/2015 | Li | |
| 2020/0162337 A1* | 5/2020 | Jain | H04L 41/20 |
| 2020/0396301 A1* | 12/2020 | Abhigyan | H04L 67/10 |
| 2021/0297891 A1* | 9/2021 | Berzin | H04L 45/02 |
| 2021/0320820 A1* | 10/2021 | Ruan | H04L 49/602 |

* cited by examiner

METHOD AND SYSTEM FOR HYBRID SOFTWARE DEFINED NETWORKING IN A TERRESTRIAL PLUS MOBILE NETWORK NODE NETWORK

CROSS-REFERENCE TO RELATED APPLICATIONS AND INCORPORATION BY REFERENCE

The present application claims the benefit under 35 U.S.C. 119(e) of U.S. Provisional Application Ser. No. 63/310,527, filed Feb. 15, 2022, which is incorporated herein by reference in its entirety.

FIELD

The present teachings apply to low earth orbit satellite systems that have dynamic intersatellite links and other networks not static in their position relative to an end device or other network nodes. In one embodiment, the present teachings apply to a network including mobile nodes with a deterministic topology. The mobile nodes may utilize inter- and/or intra-mobile node links that make or break to links to neighbors or ground stations as a function of where a mobile node is along its deterministic path. Exemplary mobile nodes include Medium Earth Orbit (MEO) satellite systems, Low Earth Orbit (LEO) satellite systems, High Altitude Platforms (HAPs) or the like. The present teachings ensure that:
  Network node complexity is minimized;
  Mobile nodes are treated as interior nodes without complex interactions with an SDN (Software Defined Network) controller;
  A translation function to handle the differences between standard headers in use on terrestrial networks and optimized headers used over a mobile node network;
  A boundary function to deal with the temporal or real-time changes in the mobile node topology;
  Anchored services despite mobile nodes; and
  Fast re-routing is handled when mobile nodes or their links fail.

BACKGROUND

In the prior art a software defined network may have a control plane and data plane separated and where some network nodes move relative to the end devices that they service. This contrasts to many networks where all network nodes are static in position regardless of whether the end devices are static or mobile. Given the following:
  Such moving network nodes may have limited processing capability and are not necessarily easily upgraded after initial deployment,
  Such moving network nodes have constantly changing neighbors and topologies,
  There is an inherent delay between these nodes and any SDN Controller node, and
  Such moving networks may need to interoperate with fixed terrestrial networks providing stateful services to nodes whose flows traverse the mobile network.
In such networks, it is difficult to:
  Deal with the limited resources on the mobile network nodes when dealing with overhead and tag processing,
  Have source routes where some of the hops are via a dynamically changing network topology due to constantly changing satellite to ground beam coverage and satellite to satellite link changes, and
  Reduce the complexity of network nodes such that the complexity can reside in nodes that are more readily upgradable (e.g., hardware resources).

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions.

In some aspects, the techniques described herein relate to a method for simplifying interactions of a Software Defined Network (SDN) controller, the method including: receiving a network program to traverse a mobile node network including mobile nodes and ground nodes, wherein the ground nodes include an ingress node and an egress node; forecasting links, based on a temporal line-of-sight topology, of the mobile node network between one or more of the mobile nodes and one or more of the ground nodes; determining network program subfunctions that reflect an availability of the links for a time period; selecting, for the time period, a viable path including one or more of the network program subfunctions to traverse from the ingress node to the egress node; and communicating network traffic from the ingress node to the egress node using the viable path during the time period, wherein a portion of the viable path traverses one or more of the mobile nodes and the mobile nodes move along deterministic paths.

In some aspects, the techniques described herein relate to a method, wherein the mobile nodes move along orbital paths.

In some aspects, the techniques described herein relate to a method, further including translating, at the ingress node, a standard network protocol header of the network traffic to a mobile node network header, and translating, at the egress node, the mobile node network header of the network traffic to the standard network protocol header.

In some aspects, the techniques described herein relate to a method, wherein the temporal line-of-sight topology is based on ephemeris data of the mobile nodes.

In some aspects, the techniques described herein relate to a method, wherein the temporal line-of-sight topology is based on a ground beam coverage of one or more of the mobile nodes and availability of the links between the mobile nodes.

In some aspects, the techniques described herein relate to a method, wherein one or more of the network program subfunctions includes a Segment ID (SID).

In some aspects, the techniques described herein relate to a method, wherein the selecting replaces a portion of the network program with the viable path when a timestamp is outside the time period.

In some aspects, the techniques described herein relate to a method, wherein the selecting inserts the viable path into the network program.

In some aspects, the techniques described herein relate to a method, wherein the selecting selects the one or more of the network program subfunctions based on criteria elected from one or more of Priority, Traffic Engineering, Topology and State of the mobile node network.

In some aspects, the techniques described herein relate to a method, further including anchoring, at one of the ground nodes, flows traversing through the mobile node network.

In some aspects, the techniques described herein relate to a boundary node to simplify interactions of a Software Defined Network (SDN) controller, the boundary node including: a navigator to receive a network program to traverse a mobile node network including mobile nodes and ground nodes, wherein the ground nodes include an ingress node and an egress node, to forecast links, based on a temporal line-of-sight topology, of the mobile node network between one or more of the mobile nodes and one or more of the ground nodes, to determine network program subfunctions that reflect an availability of the links for a time period, and to select, for the time period, a viable path including one or more of the network program subfunctions to traverse from the ingress node to the egress node; and a network interface to communicate network traffic from the ingress node to the egress node using the viable path during the time period, wherein a portion of the viable path traverses one or more of the mobile nodes and the mobile nodes move along deterministic paths.

In some aspects, the techniques described herein relate to a boundary node, wherein the mobile nodes move along orbital paths.

In some aspects, the techniques described herein relate to a boundary node, further including a translator to translate, at the ingress node, a standard network protocol header of the network traffic to a mobile node network header, and to translate, at the egress node, the mobile node network header of the network traffic to the standard network protocol header.

In some aspects, the techniques described herein relate to a boundary node, wherein the temporal line-of-sight topology is based on ephemeris data of the mobile nodes.

In some aspects, the techniques described herein relate to a boundary node, wherein the temporal line-of-sight topology is based on a ground beam coverage of one or more of the mobile nodes and availability of the links between the mobile nodes.

In some aspects, the techniques described herein relate to a boundary node, wherein one or more of the network program subfunctions includes a Segment ID (SID).

In some aspects, the techniques described herein relate to a boundary node, wherein the navigator replaces a portion of the network program with the viable path when a timestamp is outside the time period.

In some aspects, the techniques described herein relate to a boundary node, wherein the navigator inserts the viable path into the network program.

In some aspects, the techniques described herein relate to a boundary node, wherein the navigator selects the one or more of the network program subfunctions based on criteria selected from one or more of Priority, Traffic Engineering, Topology and State of the mobile node network.

In some aspects, the techniques described herein relate to a boundary node, wherein the navigator anchors, at one of the ground nodes, flows traversing through the mobile node network.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
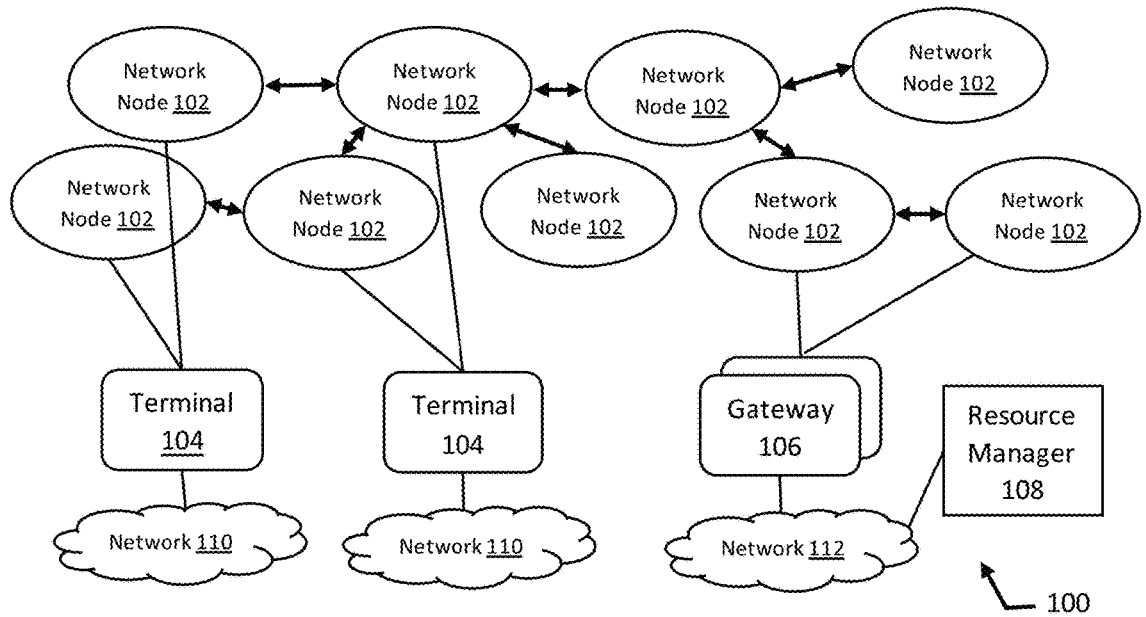
FIG. 1 illustrates a simplified LEO/MEO Architecture at a Time T according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Overview

Routing and switching protocols have existed for quite some time in terrestrial networks between routers and switches making up an intranet or internet. As the industry has evolved, some of those protocols have evolved into using Software Defined Networking (SDN) where the control plane is separated from the data plane. In one extreme, a pure SDN network has switches that perform data plane functions with the entire control plane run from a Network Operating System in an SDN Controller. Other hybrid versions exist where routers participate in routing protocols, but more complex source routing decisions are made from an SDN Controller that communicates with Edge nodes.

The routing may be performed using a network program. The network program may specify a preferred path, actions to be performed at end nodes or intermediary nodes, access control and the like. Is one aspect, the network program may instruct a border node or function to insert or replace one or more network program subfunctions necessary to traverse the mobile node network. The network program may instruct a border or ingress node to perform any network header remapping to carry the network program over and through the mobile node network. The border or ingress node may optimize the links used to traverse the mobile node network. The border or ingress node may optimize an egress node of the mobile node network.

In some embodiments, a network program may provide Segment Routing based on the Segment Routing IPv6 (SRv6) standard. SRv6 is a IP bearer protocol that combines Segment Routing (SR) and IPv6. Utilizing existing IPv6 forwarding technology, SRv6 implements network programming through flexible IPv6 extension headers.

In some embodiments, a network program may provide Segment Routing based on the Segment Routing with Multiprotocol Label Switching (SR-MPLS) standard. SR-MPLS forwards data packets using a source routing model. The core idea of SR-MPLS is to divide a packet forwarding path into different segments, allocate segment identifiers (SIDS) to the segments, and encapsulate segment information into packets at the ingress of the path to guide packet forwarding.

Low and medium earth orbiting satellite systems may include a number of network nodes (satellites) with potentially dynamic, if predictable, connections to satellite and ground nodes. A class of these systems may include Inter-Satellite Links (ISLs) that temporarily connect satellites in the constellation in the same or different plane or orbit. Such a network has the following characteristics different than traditional routing and switching networks:

a) A ground network is reachable from one or more satellite network nodes at any moment in time, but only for a limited time, b) A satellite network node is moving relative to the ground and the ground networks that it can reach change with time, c) A satellite network node is moving relative to other satellite network nodes in its planes and in other planes (it may be able to directly connect with one or more of those other satellite network nodes at any moment, but potentially only for a limited time), and d) Satellite network nodes in the same plane may be neighbors for a longer time or permanently while satellite network nodes in different planes can only neighbor transiently.

Such a satellite network system can move packets from one location on earth (from a user terminal or gateway) to another location on earth (to another user terminal or gateway). Such a satellite network system may be a part of a larger terrestrial plus space-based network. A LEO/MEO mobile node network fits well into an SDN network such as that defined in the present teachings. The SDN has implications on a mobile node LEO/MEO network. Specifically, the type and amount of interaction with an SDN Controller has implications such as: Delay of communication to/from an SDN Controller; Complexity of mobile LEO/MEO nodes; and Interoperation with terrestrial networks.

Architecture

FIG. 1 illustrates a simplified LEO/MEO Architecture at a Time T according to various embodiments.

A system 100 may include the following nodes. The system 100 may include N mobile network nodes (S-P) 102 in a constellation whose position relative to each other changes and whose position relative to the ground changes. The mobile nodes 102 may be LEO satellites in multiple planes and orbits. The mobile nodes 102 service downlink and uplink beams, which beams are changing over time. Connections to neighbors (other mobile nodes 102) change over time.

The system 100 may include a Resource Manager 108. The Resource Manager 108 knows the topology, traffic admission, and other characteristics of the mobile nodes 102, for example, the satellites of a LEO/MEO network. It is possible for an SDN controller (not shown) to talk directly with the mobile nodes 102, but it is also possible for the SDN controller to interface to the Resource Manager 108 as it already is cognizant of the topology and resource use of the constellation of the mobile nodes 102.

The system 100 may include an SDN Controller. While in theory an SDN controller could be distributed amongst one or more of the mobile nodes 102, the expectation is that it is located at one or more ground locations in a ground device that is aware of the state of all paths through the network including both the constellation and ground connectivity needs. In some embodiments, the SDN controller may be part of a hierarchical network with SDN controller to SDN controller interfaces between a mobile network SDN controller and a terrestrial network SDN controller. The paths may be generally deterministic such as orbits of the satellite based on their constellation. The paths may be used to determine a line-of-sight availability for a given time period and thus the time period for which a link between a respective satellite of the constellation and ground node infrastructure is viable. The SDN Controller need not communicate directly with the network nodes, but presumably has connectivity to an authorized entity that can.

The system 100 may include terminals 104. The terminals 104 may be a smaller form factor terminal that can receive and send traffic to one or more mobile nodes 102 that are currently in its view. The terminals 104 may be mobile or fixed. In some embodiments it is known which beam is currently servicing the terminal. The terminals 104 may be connected to a local network 110.

The system 100 may include P data gateways (not shown). This is a large form factor aggregation point that can receive and send traffic to one or more network nodes that are currently in its view. The P data gateways may utilize different uplink and downlink methods to/from network nodes as compared to terminals.

The system 100 may include system gateways 106. This is a large form factor device that can send control and configuration to network nodes as well as receive telemetry from them. The gateways 106 may utilize different uplink and downlink methods from satellites as compared to terminals. System Gateways may themselves be a routing network node for receiving packets on the downlink before forwarding them to another network node, for example, via an uplink. The system gateways need not be store and forward, since the System Gateway is expected to be able to communicate with more than one of the one or more mobile nodes 102 in its view at a time.

The system 100 may include Terrestrial Provider (T-P or just P) Nodes (not shown). Routing nodes in the network are P nodes rather than PE nodes, meaning that they are not packet sources and do not require a source route. However, to provide the best source route, the P nodes need to provide the SDN Controller directly or indirectly with state of their interfaces/links.

The system 100 may include Provider Edge (PE) Nodes (not shown) that may be colocated with one or more of the gateways 106. These nodes are the source of packets for this network and interface to an external customer network 112. These nodes may, for instance, encapsulate customer packets in an outer header with a segment list that forms a source route that it has learned from an SDN Controller. In theory, P and PE nodes can reside in the same router (e.g., as two separate virtual routing functions). A PE can be part of a terminal or Gateway that directly attaches and communicates with the mobile node network, in which case it is termed an S-PE.

The system 100 may include a Boundary (B) Node (not shown). The boundary node is responsible for translating the packet headers it has received or is sending from/to the terrestrial network to/from the more efficient and compact method required for transiting the mobile network nodes. In some embodiments, the boundary node may be a terminal performing an additional function.

Figure 2A:
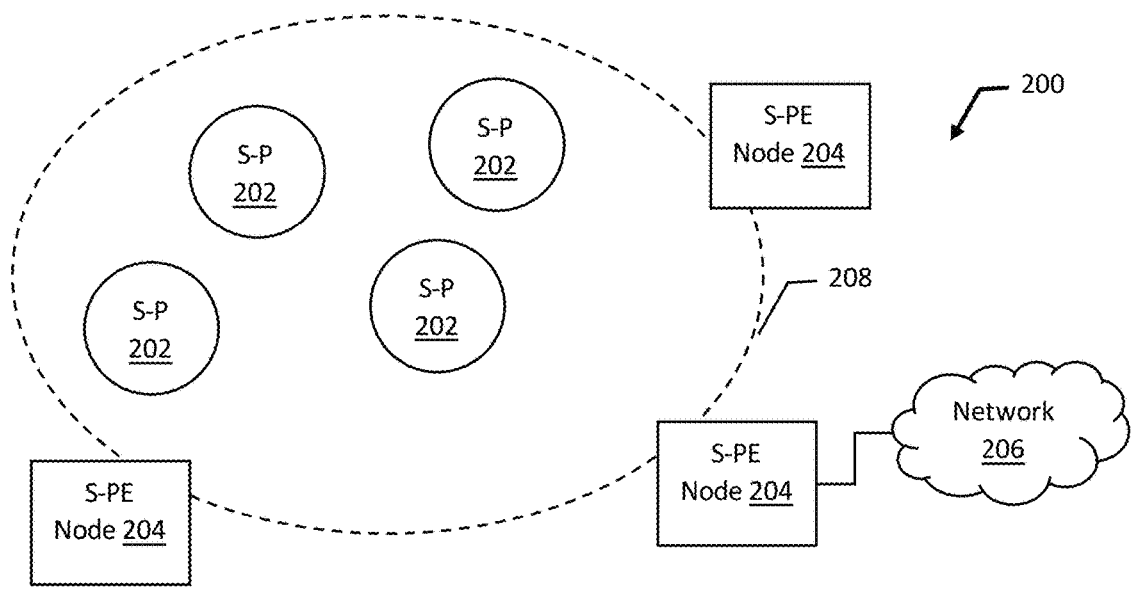
FIG. 2A illustrates a Satellite-Only SDN according to various embodiments.

FIG. 2A illustrates a Satellite-Only SDN according to various embodiments.

FIG. 2A illustrates a scenario where a SDN network 200 spans a satellite network 208 and an external network 206. In SDN network 200 source and destination of packets may be S-PE nodes 204 that are directly connected to the satellite network 208 and source routes provided to a source PE (not shown) may only have identified how to traverse satellite nodes S-P 202. The source PE may be communicating with a destination PE (not shown) on the external network 206.

Figure 2B:
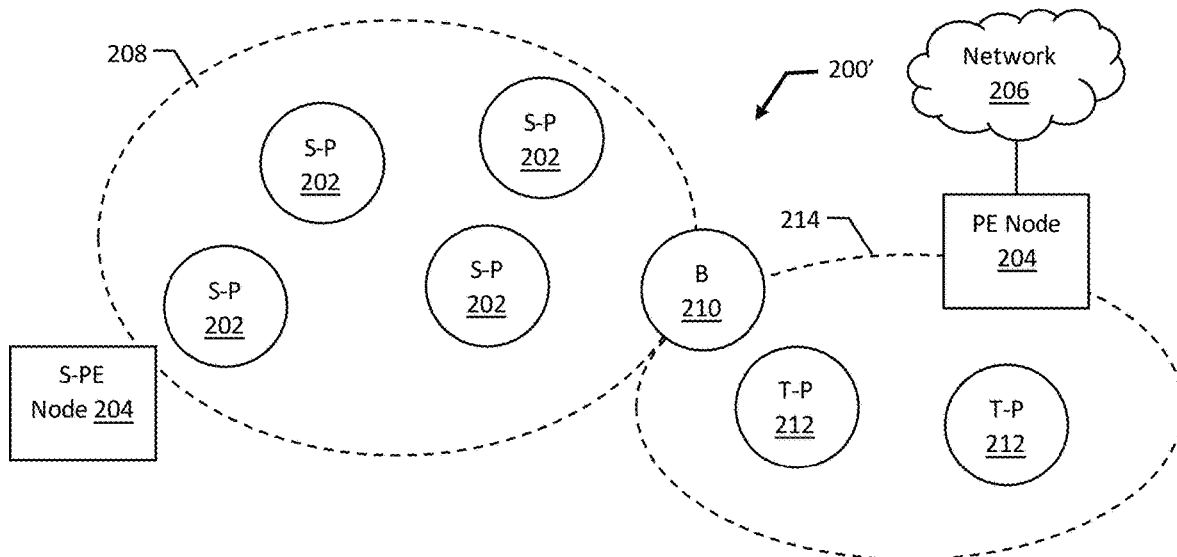
FIG. 2B illustrates a SDN across satellite network with a terminal as a PE and backhaul as part of SDN according to various embodiments.

FIG. 2B illustrates a SDN across a satellite network with a terminal as a PE and a backhaul as part of the SDN according to various embodiments.

FIG. 2B illustrates a network 200' where a terrestrial network 214 is provided. The terrestrial network 200' may provide connectivity from the gateways to external networks 206 via a border node 210, handling of overlay slices where multiple external networks 206 utilize the satellite network 208, and network services are provided in a terrestrial network 214 for some flows carried over the satellite network 208 by T-P nodes 212.

Figure 2C:
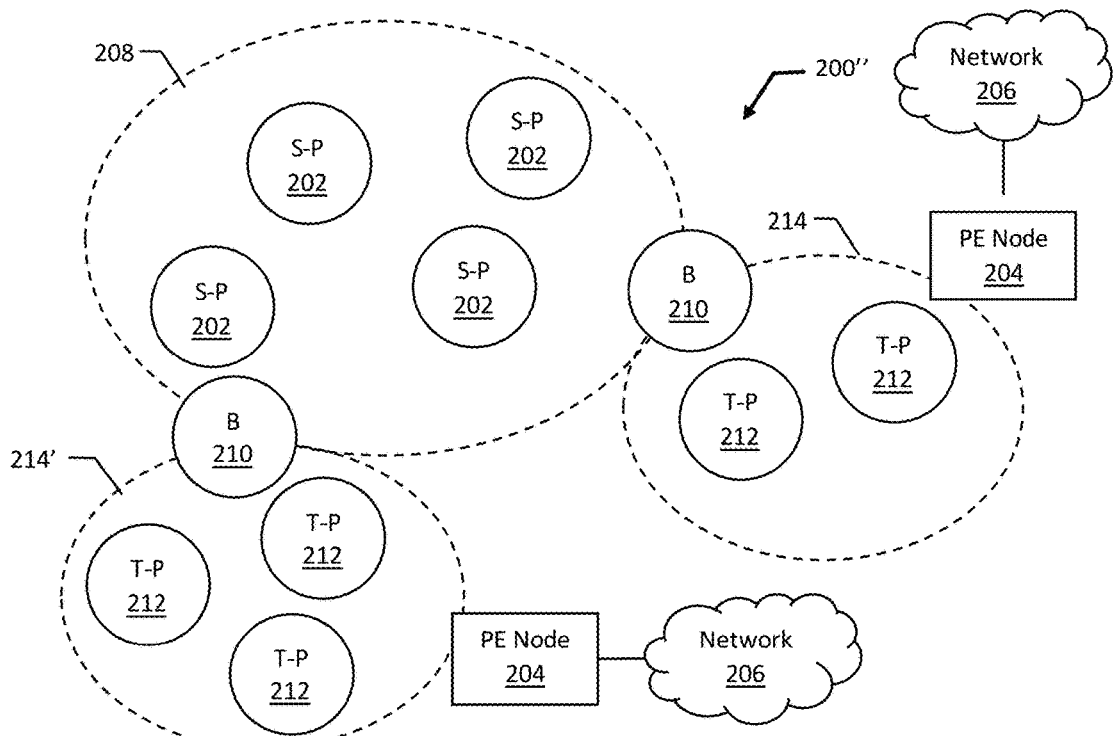
FIG. 2C illustrates a SDN with satellite as part of larger terrestrial plus satellite network according to various embodiments.

FIG. 2C illustrates a SDN with satellite as part of larger terrestrial plus satellite network according to various embodiments.

In FIG. 2C a network 200'' extends the networks of FIG. 2A and FIG. 2B to illustrate an integrated terrestrial and satellite network where some of the hops that a flow may pass include terrestrial or satellite nodes to get traffic between two customer networks (terrestrial Network 214 and terrestrial Network 214') via border nodes 210.

In exemplary embodiments a SDN network may be approached as either a pure SDN, a pure SRv6 network with SDN controller, or a hybrid.

Pure SDN

In a pure SDN approach, the LEO/MEO mobile nodes are treated as whitebox switches, albeit mobile switches. In such a scenario, when a switch receives a flow for which it is not currently maintaining state, the switch would need to query an SDN Controller to determine how to handle the flow using the SDN Controller Southbound API, for example, OpenFlow, P4Runtime, gRPC, NetCONF, or the like. There are a number of challenges with this approach, including:
- Latency, even in a LEO network, to a SDN controller impacts the amount of time required to get a response. In the meantime, during that latency, a very large number of packets can arrive on that "flow" which requires either: sub-optimal forwarding, buffering, or dropping.
- Running the SB API on all the mobile nodes and maintaining updates to that protocol as it evolves
- Storing the cache state on N flow types to reduce the need to query the SDN Controller Pure SRv6 Network In a pure SRv6 approach, the satellite mobile nodes are all "P routers/nodes" instead of "PE routers/nodes". In this approach, the source routing information is given to a PE node. This simplifies the P nodes such as the mobile node to just perform simpler operations based on the current destination IP address of the packet. There are a number of challenges with this approach, including:
- In these networks, P routers still normally perform a distributed routing protocol (e.g., ISIS). This is undesirable in a LEO/MEO satellite network.
- SRv6 has 128-bit addresses and a segment list uses many of these to define the source route from the PE node. Even in terrestrial use cases, this has been considered significant overhead and has hardware processing implications that have led to alternate proposals such as SRv6+, Compressed SID (CSID), and Micro-Segment IDs (MicroSIDs) to reduce this overhead. This overhead is more significant in a LEO/MEO satellite network. At least, these same overhead reduction reducing proposals would need to be considered to lessen both the overhead and to help with the fast switching that would be required by these LEO/MEO nodes.
- The satellite may not be designed to operate on IPv6 packet headers and may operate instead on a satellite link layer header and fixed packet size, for example.

Hybrid Approach

The hybrid approach would attempt to find a solution that resolved all of the above challenges while not losing key advantages that those pure approaches provide. The specific goals of the hybrid approach are:
a) Reduce or eliminate the need of the mobile node to need to request real-time information from an SDN Controller. A mobile node still may communicate with an SDN Controller. For instance, the mobile node may stream telemetry that an SDN Controller can consume in order to better understand the state of the network and its topology at a given or future moment in time.
b) Allow for interoperation with ground networks that utilize an SDN Controller and protocols such as SRv6 (or one of its variants).
c) Remove the complexity of processing on the satellite mobile nodes.
d) Utilize the best capabilities of SDN to simplify the solution for complexities such as a Gateway handover.
e) Treat satellite network as simpler nodes (P nodes) while utilizing existing best practice routing solutions by interfacing to a Resource Manager rather than requiring that the satellite nodes participate in certain protocols (e.g., IGP).
f) Leverage capabilities available and beneficial in terrestrial solutions such as TI-LFA.

PE Node

This is a node that is either a source/destination or is a boundary between this provider network and other external (e.g., customer) networks. A PE node may be a terminal that connects directly to the satellite, or a router or network device that does not connect directly to the satellite. A PE node may or may not reside with a Gateway that connects to the satellite.

Terrestrial P Node

A terrestrial P node is a ground-based router that is part of the SDN network. It may or may not reside with a Gateway that connects to the satellite. It may or may not participate in traditional IGP protocols. It may send topology information via an SB Interface of the SDN controller. It may send telemetry on the state of its links (e.g., traffic engineering information) to a SB Interface of the SDN controller. It may process packets as a function of the packet header. For instance, with SRv6, SRv6+, or microSID, it may either forward, or process header and forward depending upon if the current destination tag identifies it or another node.

Satellite P Node

This is a satellite mobile node (E.g., LEO or MEO satellite) that is part of the SDN network, but is mobile and satellite-based. It is likely not to participate in traditional IGP protocols. It does send telemetry on the state of its links (e.g., traffic engineering information) either directly or indirectly to the SDN controller. It does process packets as a function of the packet header. For instance, with destination tags, it may either forward, or process header and forward depending upon whether the current destination tag identifies it or another node.

In one embodiment, the satellite mobile node may provide services to the packet and participate in a service function chain. This is less likely due to current processing limits of mobile nodes, for example, in mobile satellites. In a scenario where it did provide this, the mobile node may be used as part of the network or service program provided to traverse the mobile node network.

Satellite Network Boundary Node

When carrying SRv6, SRv6+, or microSIDs provides too much overhead and processing on a Satellite P Node, a satellite network boundary node can perform the following. For traffic Inbound into satellite network, the boundary node may take a terrestrial source route packet header (e.g., SRv6) and create a satellite efficient header with tag. In one embodiment, the boundary node may replace the original packet header by translating the information present between the two formats. In some embodiments, the boundary node may encapsulate and potentially compress the original packet header.

For outbound traffic from a satellite network, the boundary node may take a satellite efficient header with tags and recreate a terrestrial source route packet header (e.g., SRv6). In some embodiments, the boundary node may replace the satellite efficient header with tags by translating the information present between the two formats. In some embodiments, the boundary node may de-encapsulate and potentially decompress the original packet header. In some embodiments, the boundary node may potentially move the pointer past any network SIDs that were in the satellite network itself.

SDN Controller

Figure 3:
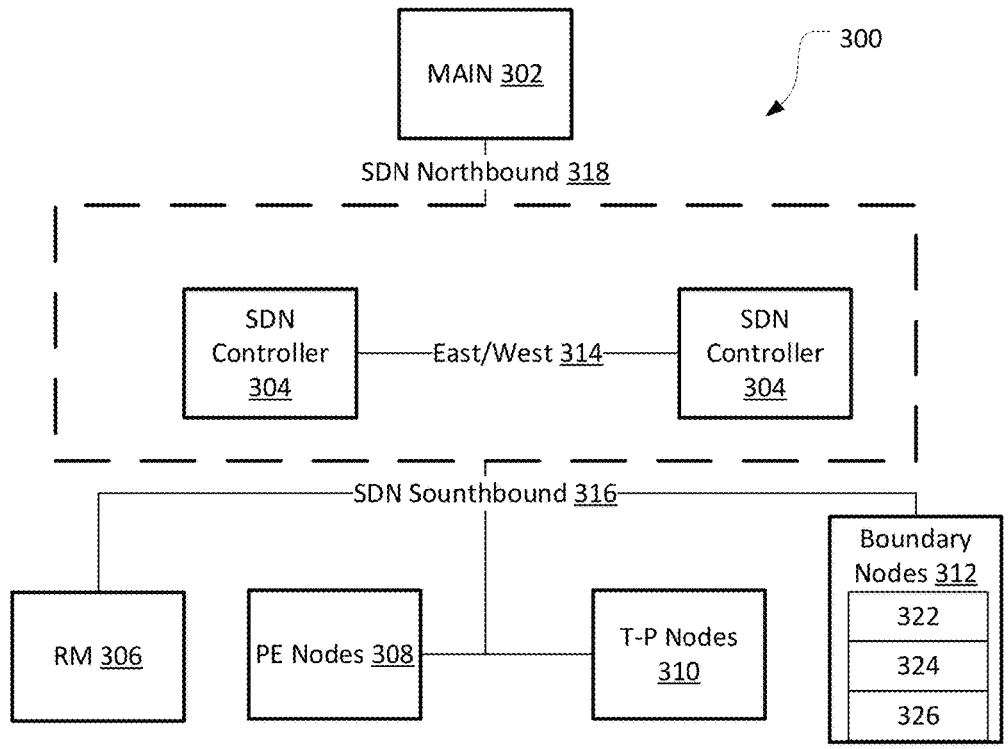
FIG. 3 illustrates a SDN satellite network according to various embodiments.

FIG. 3 illustrates a SDN satellite network according to various embodiments.

An SDN network 300 may include SDN controllers 304, an East/West interface 314, a Northbound interface 318 and a Southbound interface 316. The East/West interface 314 may be used to communicate between SDN controllers 304. The Northbound interface 318 allows the SDN controllers 304 to get information from an Orchestration layer controller 302. Southbound interface 316 can be utilized, for example, to learn the network topology including satellite PE nodes 308, T-P nodes 310 and boundary nodes 312. The southbound interface 316 may be used communicate changes in the topology due to, for example, failures or other reasons, to receive information on the network usage for Traffic Engineering, to provide source routes to source nodes to route a flow through the network, or the like. The source routes may be a function of criteria such as Priority, Traffic Engineering, Topology and State of the network.

A Resource Manager 306 may periodically, based on a set of inputs, calculate a set of tables to be used by each satellite network node for each time period into the future. The Resource Manager 306 may provide information to SDN controllers 304 on a topology of S-P nodes. The topology can be used to determine source routes through a satellite and terrestrial network from a first border to a second border.

In a satellite network where delays to the SDN controller can be a concern, the SDN controller may run in a mode where some clusters are hosted on satellite P nodes themselves. This mode has implications on processing on satellites and concerns over how existing protocols (for example, Atomix clustering) would work with nodes on the ground and mobile nodes with latency in space.

The present teachings use time-based tables and multicasting. In some embodiments, time-based tables from a resource manager can be used to assist satellite PE nodes 308 and Boundary nodes 312 with topology. The time-based tables may be extended to include SRv6 tag-like information for both the satellite network and terrestrial networks while accounting the time-of-day topology changes. In some embodiments, the ability to multicast over the satellite network can be used to help ensure that Satellite PE nodes and Boundary nodes have the topology. The SDN Controller 304 may multicast relevant information to multiple source PE/boundary nodes.

The boundary nodes 312 may act as an ingress node for a mobile node network. The boundary nodes 312 may act as an egress node for a mobile node network. The boundary nodes 312 may include a translator 322 to translate between a standard network protocol header and a mobile node network header, and vice-versa. The boundary nodes 312 may include a navigator 324 to receive a network program to traverse a mobile node network comprising mobile nodes and ground nodes, wherein the ground nodes comprise an ingress node and an egress node. The navigator 324 may forecast links, based on a temporal line-of-sight topology, of the mobile node network between one or more of the mobile nodes and one or more of the ground nodes. The navigator 324 may determine network program subfunctions that reflect an availability of the links for a time period. The navigator 324 may select, for the time period, a viable path comprising one or more of the network program subfunctions to traverse from the ingress node to the egress node. The boundary nodes 312 may include a network interface 326 to communicate from the ingress node to the egress node using the viable path during the time period.

Satellite Network Node Actions

As a P node, the satellite network node receives instructions for how to handle the active tag as a function of time. Exemplary functions included in a tag may, for example, replicate the packet for multicast; create a copy of the packet with different tags, or the like. The active tag may indicate at least one of the following functions:

a) Consume the packet as the destination.
 b) Route the packet to the indicated interface (downlink to beam or ISL)

c) Pop the current tag to the next tag and route the packet to the indicated interface (downlink to beam or ISL).
d) Perform a service on the packet, pop the current tag to the next tag and route the packet to the indicated interface (downlink to beam or ISL).

The satellite network node may provide information via telemetry to the SDN controller (could be direct or indirect) that includes information as a function of time including, for example, utilization of links per priority, any packet drop per link per priority, expected capacity per link, or the like.

PE Network Node Actions

When the PE Network Node is a terrestrial node, it has the responsibility for generating SIDS lists based on local cache and an interface to the SDN Controller. The SID list may traverse the entire SRv6 domain.

When the PE Network Node is also a satellite uplink/downlink node, it is similar to a boundary node. For example, it may use a more efficient tag list to traverse the satellite, it may create a SID list for terrestrial network hops at the other side of the satellite network, or it need not translate/handle cases of receiving SRv6 packets from a terrestrial PE (discussed in more detail in the subsequent subsection).

Boundary Node Actions

The boundary node may translate between segment ids used in the terrestrial network and the tags used in the satellite network. This may provide more efficient tags over the satellite interfaces. The boundary node may insert/remove tags for use over the satellite network based on the expected topology at the time the packet arrives. For example, if there is a tag that is meant to get a packet to a specific node in satellite network and satellite topology is time changing, then a source far from the satellite network cannot time its packet to get to the satellite network when topology is in a predicted state, So, since a boundary node must perform a translation anyway, the boundary node acts as a PE itself for the purposes of getting a new source route optimized for mobile node network traversal. In this sense, all of the following are possibilities:

Boundary Node End-to-End Predictive Source Route with Opportunity to Correct

In some embodiments, a Boundary Node may implement an End-to-End Predictive Source Route with an Opportunity to Correct. In this case, the source route may include terrestrial and mobile node network SIDs with the complete end to end path. As the packet traverses a terrestrial network on its way to the Boundary Node, it may or may not arrive at the expected time and the predicted locations of the mobile nodes to each other and the ground are incorrect. The boundary node may access the mobile node network. The access may either be direct access to knowledge of current satellite network state or an ability to learn satellite network state via query. As such, the boundary node can determine whether the timing in the original source route can be maintained across the mobile nodes or not.

When the boundary node determines that the timing worked, it can translate the SID list into the more efficient tag form to be used by the satellite P nodes and forward based on the existing SID list. When the boundary node determines that the timing is early or late, it can replace the satellite network SIDs with new satellite network SIDs as well as translate that new SID list into the more efficient tag form to be used by the satellite P nodes before forwarding. In addition, the boundary node may maintain the SIDs (either via translation or compression) for any subsequent terrestrial hops beyond the mobile node network.

Figure 4:
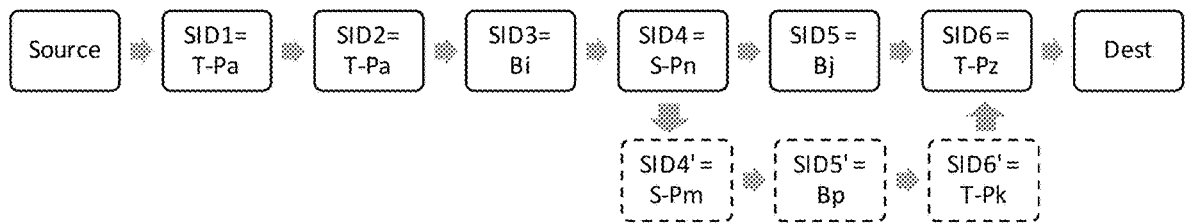
FIG. 4 illustrates a Segment ID (SID) list correction by a Boundary Node according to various embodiments.

FIG. 4 illustrates a SID list correction by a Boundary Node according to various embodiments.

For example, an end-to-end SID list arrives at Bi at time X. If at time X at Bi, the SID list meets the original prediction of when the source route was provided to the Source PE, then SID4 and SID5 can remain intact. If the topology at time X when it arrives Bi does not meet the original prediction of when the source route was provided to the Source, then Bi can replace the SIDs/tags for the mobile node portion with more or fewer SIDs. In this example, SID4=S-Pn and SID5=Bj are replaced with SID4'=S-Pm, SID5'=S-Pp, and SID6'=Bk.

Boundary Node Inserts SIDs for Mobile Node Network Traversal

In some embodiments, a Boundary Node may receive a Source Route with terrestrial SIDs for before and after the mobile node network where a Boundary Node inserts SIDs for mobile node network traversal. In this case, there is no attempt to predict the state of the satellite network given that the terrestrial network may have queuing and other factors that make it hard to predict the state of the mobile node network when the packet arrives at the Boundary Node. The original PE node, in this case, may receive a SID list to traverse both terrestrial networks (before and after the mobile node network). In this case, the boundary node retains the SIDs for use outside of the mobile node network, but inserts tags to optimally source route the packet through the mobile node network as a function of the current topology and state when it expects to uplink the packet.

Figure 5:
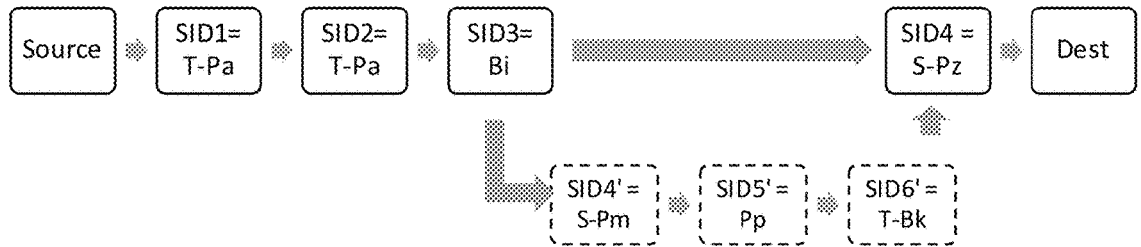
FIG. 5 illustrates a SID list insertion by a Boundary Node according to various embodiments.

FIG. 5 illustrates a SID list insertion by a Boundary Node according to various embodiments.

When an example end to end SID list arrives at Bi a Boundary Node Bi can insert additional identifiers based on the current topology of the mobile node network. For example, the additional identifiers may include SID4'=S-Pm, SID5'=S-Pp, and SID6'=Bk.

Boundary Node Bridges two Source Routes

In some embodiments, a Boundary Node may receive a SID list from a Source Route to Boundary Node Only followed by another Source Route from Boundary Node to an SRv6 PE egress edge. This SID list treats two of the networks as independent—the first terrestrial network is treated as one network and the mobile node network along with the second terrestrial network is treated as one network. From that perspective, the source PE gets a source route to the Boundary Node. The Boundary gets a source route only for traversing the mobile node network and for traversing the subsequent terrestrial network.

Figure 6A:
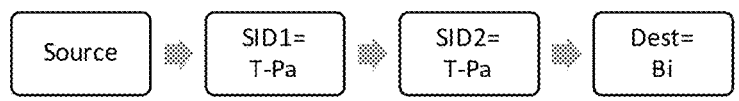
FIG. 6A illustrates a SID list sent by a Source PE that terminates at Bi according to the various embodiments.

FIG. 6A illustrates a SID list sent by a Source PE that terminates at Bi according to the various embodiments.

Figure 6B:
FIG. 6B illustrates a new SID list created by the Boundary Node Bi to get it to the final PE at the egress of a mobile node network.

FIG. 6B illustrates a new SID list created by the Boundary Node Bi to get it to the final PE at the egress of a SRv6 network.

In some embodiments, each network segment may be treated independent. Each network to be traversed may be independently handled. The networks may include a first terrestrial network, a mobile node network, and a second terrestrial network. In this embodiment, the source PE gets a source route to the Boundary Node. The Boundary gets a source route only for traversing the mobile node network, and another PE gets a source route for traversing the subsequent terrestrial network.

Figure 6C:
FIG. 6C illustrates a new SID list created by the Boundary Node Bi to get it to the Boundary Node Bk at an edge of the mobile node network, when the SID list of FIG. 6A is received at the Boundary Node Bi.

FIG. 6C illustrates a new SID list created by the Boundary Node Bi to get it to the Boundary Node Bk at an edge of the mobile node network, when the SID list of FIG. 6A is received at the Boundary Node Bi.

Figure 6D:
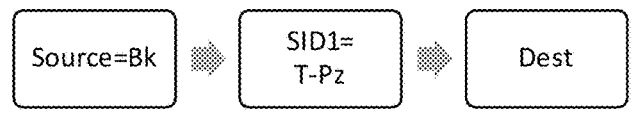
FIG. 6D illustrates a new SID list created by the Boundary Node Bk to get it to the final PE at the egress of the mobile node network.

FIG. 6D illustrates a new SID list created by the Boundary Node Bk to get it to the final PE at the egress of the mobile node network.

Use Cases

Figure 7:
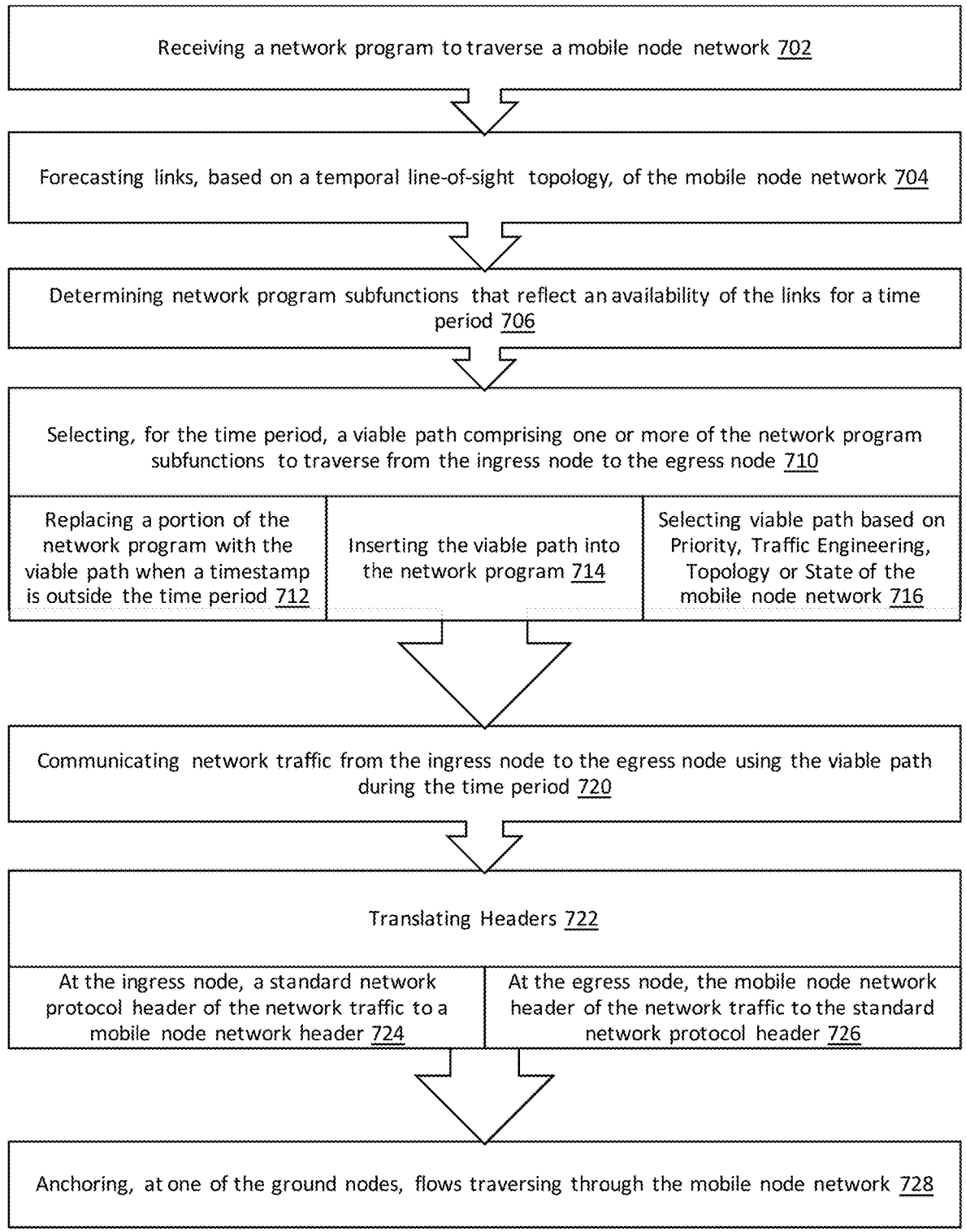
FIG. 7 illustrates a process flow diagram of the present according to various embodiments.

FIG. 7 illustrates a process flow diagram of the present according to various embodiments.

A method 700 may include an operation 702 for receiving a network program to traverse a mobile node network. The method 700 may include operation 704 for forecasting links, based on a temporal line-of-sight topology, of the mobile node network. The method 700 may include operation 706 for determining network program subfunctions that reflect an availability of the links for a time period.

The method 700 may include operation 710 for selecting, for the time period, a viable path comprising one or more of the network program subfunctions to traverse from the ingress node to the egress node. The operation 710 may include operation 712 for replacing a portion of the network program with the viable path when a timestamp is outside the time period. The operation 710 may include operation 714 for inserting the viable path into the network program. The operation 710 may include operation 716 for selecting a viable path based on Priority, Traffic Engineering, Topology or State of the mobile node network.

The method 700 may include operation 720 for communicating network traffic from the ingress node to the egress node using the viable path during the time period. The method 700 may include operation 722 for translating Headers in network traffic traversing the mobile nodes. At the ingress node, operation 724 may translate a standard network protocol header of the network traffic to a mobile node network header. At the egress node, operation 726 may translate the mobile node network header of the network traffic to the standard network protocol header. The method 700 may include operation 728 for anchoring, at one of the ground nodes, flows traversing through the mobile node network.

The present teachings can be used to provide Anchoring Services. While all of the following changes dynamically—source boundary node, path through satellite network destination boundary node—it is possible that certain services are being provided to a flow. Examples of services include but are not limited to: TCP Performance Enhancing Proxies (PEP), Firewall, Traffic/Application Identification/Classification, Traffic Shaping, Carrier Grade NAT. When the service is stateful vs stateless, this makes it desirable to anchor the flow to one or more terrestrial servers that provide these services without requiring all flows to be routed through them. Adding the correct SIDS allows the flows that require these services to reach these services that have their state even though the path through the mobile network and the terrestrial Gateway on which the flow lands is changing dynamically.

The present teachings can be used to provide GW Diversity. There are a number of reasons why different Gateways could utilize a set of flows sent over a mobile node network and why it would be desirable to utilize a different Gateway for a given flow, including but not limited to weather, line of sight blockage, load balancing, failure cases, etc. A soft system where the tags can be changed at the source is in a good position to update the source to change the tags dynamically and quickly to utilize a different Gateway as a function of an external algorithm determining a better Gateway for the landing of the flow.

The present teachings can be used to provide Fast Reaction to Failures in Mobile Network. TI-LFA (fast re-route) is used in terrestrial networks running SRv6 to insert an SRH that can re-route packets very quickly using the optimal route while routing protocols are still converging and before an SDN controller can react. This same concept can be extended to a mobile node network even if it is not running a dynamic routing protocol (e.g., if using a hybrid or static routing model). In these cases, the alternate tags can include a complete reroute of the packet as calculated ahead of time by a Resource Manager and uploaded to the satellite P nodes using time-based tables, such that any real-time failures detected can add additional tags to the packet to quickly route around the failure.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. A method for simplifying interactions of a Software Defined Network (SDN) controller, the method comprising:
receiving a network program to traverse a mobile node network comprising mobile nodes and ground nodes, wherein the ground nodes comprise an ingress node and an egress node;
forecasting links, based on a temporal line-of-sight topology, of the mobile node network between one or more of the mobile nodes and one or more of the ground nodes;
determining network program subfunctions that reflect an availability of the links for a time period;
selecting, for the time period, a viable path comprising one or more of the network program subfunctions to traverse from the ingress node to the egress node; and
communicating network traffic from the ingress node to the egress node using the viable path during the time period,
wherein a portion of the viable path traverses one or more of the mobile nodes and the mobile nodes move along deterministic paths.

2. The method of claim 1, wherein the mobile nodes move along orbital paths.

3. The method of claim 1, further comprising translating, at the ingress node, a standard network protocol header of the network traffic to a mobile node network header, and translating, at the egress node, the mobile node network header of the network traffic to the standard network protocol header.

4. The method of claim 1, wherein the temporal line-of-sight topology is based on ephemeris data of the mobile nodes.

5. The method of claim 1, wherein the temporal line-of-sight topology is based on a ground beam coverage of one or more of the mobile nodes and availability of the links between the mobile nodes.

6. The method of claim 1, wherein one or more of the network program subfunctions comprises a Segment ID (SID).

7. The method of claim 1, wherein the selecting replaces a portion of the network program with the viable path when a timestamp is outside the time period.

8. The method of claim 1, wherein the selecting inserts the viable path into the network program.

9. The method of claim 1, wherein the selecting selects the one or more of the network program subfunctions based on criteria selected from one or more of Priority, Traffic Engineering, Topology and State of the mobile node network.

10. The method of claim 1, further comprising anchoring, at one of the ground nodes, flows traversing through the mobile node network.

11. A boundary node to simplify interactions of a Software Defined Network (SDN) controller, the boundary node comprising:
- a navigator
  - to receive a network program to traverse a mobile node network comprising mobile nodes and ground nodes, wherein the ground nodes comprise an ingress node and an egress node,
  - to forecast links, based on a temporal line-of-sight topology, of the mobile node network between one or more of the mobile nodes and one or more of the ground nodes,
  - to determine network program subfunctions that reflect an availability of the links for a time period, and
  - to select, for the time period, a viable path comprising one or more of the network program subfunctions to traverse from the ingress node to the egress node; and
- a network interface to communicate network traffic from the ingress node to the egress node using the viable path during the time period,
- wherein a portion of the viable path traverses one or more of the mobile nodes and the mobile nodes move along deterministic paths.

12. The boundary node of claim 11, wherein the mobile nodes move along orbital paths.

13. The boundary node of claim 11, further comprising a translator to translate, at the ingress node, a standard network protocol header of the network traffic to a mobile node network header, and to translate, at the egress node, the mobile node network header of the network traffic to the standard network protocol header.

14. The boundary node of claim 11, wherein the temporal line-of-sight topology is based on ephemeris data of the mobile nodes.

15. The boundary node of claim 11, wherein the temporal line-of-sight topology is based on a ground beam coverage of one or more of the mobile nodes and availability of the links between the mobile nodes.

16. The boundary node of claim 11, wherein one or more of the network program subfunctions comprises a Segment ID (SID).

17. The boundary node of claim 11, wherein the navigator replaces a portion of the network program with the viable path when a timestamp is outside the time period.

18. The boundary node of claim 11, wherein the navigator inserts the viable path into the network program.

19. The boundary node of claim 11, wherein the navigator selects the one or more of the network program subfunctions based on criteria selected from one or more of Priority, Traffic Engineering, Topology and State of the mobile node network.

20. The boundary node of claim 11, wherein the navigator anchors, at one of the ground nodes, flows traversing through the mobile node network.

* * * * *